US012019172B2

(12) United States Patent
McLellan et al.

(10) Patent No.: US 12,019,172 B2
(45) Date of Patent: Jun. 25, 2024

(54) MOBILE DELIVERY DEVICE METHODS AND SYSTEMS

(71) Applicant: United States Postal Service, Washington, DC (US)

(72) Inventors: Charles P. McLellan, Fairfax, VA (US); Collier C. Apgar, Washington, DC (US)

(73) Assignee: United States Postal Service, Washington, DC (US)

( * ) Notice: Subject to any disclaimer, the term of this patent is extended or adjusted under 35 U.S.C. 154(b) by 563 days.

(21) Appl. No.: 17/119,990

(22) Filed: Dec. 11, 2020

(65) Prior Publication Data

US 2021/0181359 A1   Jun. 17, 2021

Related U.S. Application Data

(60) Provisional application No. 62/946,913, filed on Dec. 11, 2019.

(51) Int. Cl.
| | |
|---|---|
| *G01S 19/42* | (2010.01) |
| *H04W 4/02* | (2018.01) |
| *H04W 4/024* | (2018.01) |
| *H04W 4/029* | (2018.01) |

(52) U.S. Cl.
CPC ............. *G01S 19/42* (2013.01); *H04W 4/029* (2018.02); *H04W 4/024* (2018.02); *H04W 4/025* (2013.01)

(58) Field of Classification Search
CPC .... G01S 19/42; G01S 19/03; G01S 2205/001; H04W 4/024; H04W 4/029; H04W 4/025; H04W 4/20; H04W 4/02; G06F 16/13
See application file for complete search history.

(56) References Cited

U.S. PATENT DOCUMENTS

| | | | | |
|---|---|---|---|---|
| 6,934,945 | B1* | 8/2005 | Ogilvy | H04L 9/40 718/1 |
| 2003/0014539 | A1* | 1/2003 | Reznick | H04L 67/63 707/E17.112 |
| 2012/0317035 | A1* | 12/2012 | Royyuru | G06Q 20/382 705/16 |
| 2014/0324249 | A1* | 10/2014 | Lacaze | G05D 1/0038 701/2 |
| 2015/0378674 | A1* | 12/2015 | Ruff | H03M 7/06 708/204 |
| 2016/0286355 | A1* | 9/2016 | Shur | H04W 4/025 |

(Continued)

*Primary Examiner* — Tonia L Dollinger
*Assistant Examiner* — Mehulkumar J Shah
(74) *Attorney, Agent, or Firm* — KNOBBE, MARTENS, OLSON & BEAR LLP

(57) ABSTRACT

A system and method for tracking mobile devices. The system can include a data center and a plurality of mobile devices in communication with the data center via the network. Each mobile device can include at least one sensor configured to periodically generate tracking data records, a memory, and a processor in communication with the at least one sensor and the memory. The mobile devices can transmit sets of tracking data records to the data center using reduced bandwidth relative to the original records by implement compression algorithms that can include delta encoding and/or numeric base conversion of number valued fields, as well as additional compression techniques that may be reversed at the data center to reconstruct the original records or otherwise decompress the data.

19 Claims, 7 Drawing Sheets

(56) References Cited

U.S. PATENT DOCUMENTS

| | | | |
|---|---|---|---|
| 2017/0006430 A1* | 1/2017 | Chao | G01S 5/02524 |
| 2019/0102840 A1* | 4/2019 | Perl | G06Q 40/08 |
| 2019/0310643 A1* | 10/2019 | Yokoi | B63B 32/60 |
| 2020/0019928 A1* | 1/2020 | Skaaksrud | H04W 52/223 |
| 2020/0289026 A1* | 9/2020 | Bardy | A61B 5/6824 |

* cited by examiner

MOBILE DELIVERY DEVICE METHODS AND SYSTEMS

CROSS-REFERENCE TO RELATED APPLICATIONS

This application claims the benefit of priority to U.S. Provisional Application Ser. No. 62/946,913, filed Dec. 11, 2019, entitled MOBILE DELIVERY DEVICE METHODS AND SYSTEMS, which is incorporated by reference herein in its entirety.

FIELD

This disclosure relates to systems and methods for mobile delivery devices, and in particular, to systems and methods for efficient transmission of information from the mobile device to a remote device, including mobile delivery device location coordinates and acceleration data.

BACKGROUND

Delivery services and corresponding routes are frequently serviced by carriers assisted by mobile delivery devices. Mobile delivery devices can include GPS or other location tracking functionality and may transmit related location data to a remote computer system for real-time tracking and/or analysis of the location data. In distribution networks employing a large number of carriers servicing a large number of routes simultaneously, the amount of location data being generated at the carriers' mobile delivery devices may be very large, and can be cumbersome, inefficient, and costly to transmit over a wireless network such as a cellular network, mobile data connection, etc.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages.

In a first aspect, a system for tracking one or more mobile devices in a distribution network comprises a data center in communication with a network and a plurality of mobile delivery devices in communication with the data center via the network. Each mobile delivery device comprises one or more sensors configured to periodically generate tracking data records, a memory, and a processor in communication with the one or more sensors and the memory. The processor is configured to receive the tracking data records from the one or more sensors; cause the received tracking data records to be stored in the memory; select, from the stored tracking data records, a set of tracking data records for compression; compress the set of tracking data records, by at least applying delta encoding or numeric base conversion to one or more number valued fields of at least a subset of the set of tracking data records, to generate a compressed data set; and transmit the compressed data set to the data center via the network.

In some embodiments, the data center comprises a data store and a server in communication with the network and the data store, the server configured to receive the compressed data set via the network. In some embodiments, the server is further configured to decompress the compressed data set to generate a set of reconstructed tracking data records and cause the set of reconstructed tracking data records to be stored in the data store. In some embodiments, the server is further configured to cause the compressed data set to be stored in the data store and retrieve the compressed data set from the data store prior to decompressing the compressed data set. In some embodiments, the one or more sensors comprise a GPS receiver, and the tracking data records comprise GPRMC location data records. In some embodiments, the one or more sensors comprise an accelerometer, and the tracking data records comprise 3-axis acceleration data records. In some embodiments, the set of tracking data records is selected from the individual tracking data records based on a periodic schedule. In some embodiments, the processor is configured to transmit subsequent compressed data sets to the data center periodically at a predetermined time interval, and the processor is configured to select subsequent sets of tracking data records for compression at the predetermined time interval, each subsequent set comprising the tracking data records received since a preceding set of tracking data records was selected.

In a second aspect, a mobile device configured for efficient device tracking comprises a GPS receiver configured to periodically generate location data records and to transmit the location data records, a memory, and a processor in communication with the GPS receiver, the memory, and a wireless data network. The processor is configured to receive the location data records from the GPS receiver; cause the received location data records to be stored in the memory; select, from the stored location data records, a set of location data records for compression; compress the set of location data records by at least applying delta encoding and numeric base conversion to one or more number valued fields of at least a subset of the set of location data records, to generate a compressed location data set; and transmit the compressed location data set to a remote computing device via the wireless data network.

In some embodiments, the location data records generated by the GPS receiver are GPRMC records. In some embodiments, the compressed location data set comprises a set of compressed records having an average size of less than 10 bytes per record. In some embodiments, the delta encoding comprises replacing at least a time value, a latitude value, or a longitude value of each record in the subset with a delta value calculated based on a corresponding value in a preceding record. In some embodiments, the numeric base conversion comprises replacing at least one field value with one or more characters generated by converting the field value from a decimal value to a base-62 value. In some embodiments, compressing the set of location data records further comprises eliminating at least one field and at least one field separator from each record in the subset. In some embodiments, compressing the set of location data records further comprises deleting at least a date portion of a device time field each record in the subset.

In a third aspect, a mobile device configured for efficient device tracking comprises an accelerometer configured to periodically generate acceleration data records and to transmit the acceleration data records, a memory, and a processor in communication with the accelerometer, the memory, and a wireless data network. The processor is configured to receive the acceleration data records from the accelerometer; cause the received acceleration data records to be stored in the memory; select, from the stored acceleration data records, a set of acceleration data records for compression;

compress the set of acceleration data records by at least applying delta encoding and numeric base conversion to at least a subset of the acceleration data records, to generate a compressed acceleration data set; and transmit the compressed acceleration data set to a remote computing device via the wireless data network.

In some embodiments, the acceleration data records generated by the accelerometer comprise a device time field and a 3-axis acceleration field. In some embodiments, applying the delta encoding comprises replacing a value in the device time field of each record in the subset with a delta value calculated based on an entry in the device time field of a preceding record. In some embodiments, applying the numeric base conversion comprises replacing the delta value of each record in the subset with one or more Unicode characters corresponding to a hexadecimal value calculated based on the delta value. In some embodiments, applying the numeric base conversion comprises replacing each value in the 3-axis acceleration field of each record in the subset with an ASCII symbol corresponding to a 2-digit number calculated based on the value.

BRIEF DESCRIPTION OF THE DRAWINGS

These drawings and the associated description herein are provided to illustrate specific embodiments of the invention and are not intended to be limiting.

DETAILED DESCRIPTION

Figure 1:
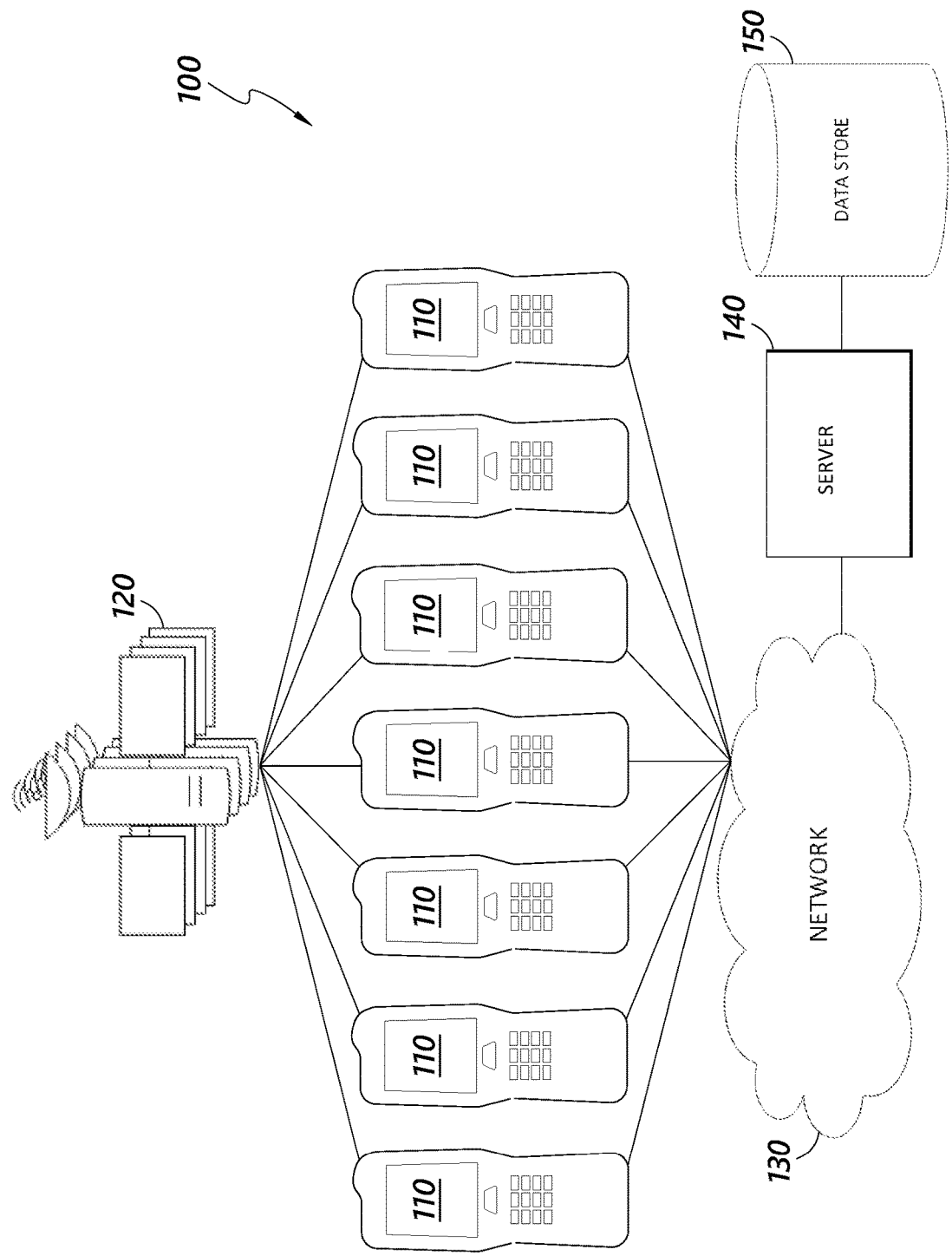
FIG. 1 is a block diagram schematically illustrating an example set of mobile devices in communication with a remote computer system.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The present disclosure relates to systems and methods for efficient handling and transmission of location data, including, for example, Global Positioning System (GPS) and/or accelerometer data. In some embodiments, the location and/or accelerometer data may be obtained at a mobile device such as a mobile delivery device carried by an item carrier of a distribution network. A distribution network may deliver and/or pick up items, such as mail pieces, letters, flats, magazines, periodicals, packages, parcels, and the like, over a large geographic area that is divided into one or more delivery routes. Modern distribution networks, such as the United States Postal Service (USPS), often utilize mobile delivery devices that are used by item carriers who pick up and deliver the items. The mobile devices may perform or facilitate a variety of functions, such as displaying instructions to the item carrier, scanning certain items at a time of delivery or pick up, and tracking the item carrier's progress along the item carrier's assigned route. In order to enable location tracking, mobile devices may include a GPS module that periodically determines GPS location records based on GPS satellite signals. A mobile device may store the determined GPS location records and transmit the records to a remote computing system, such as a central, regional, or local data center, server, or data store of the distribution network.

In some implementations, a distribution network may utilize a large number of mobile devices, and the amount of location data to be transmitted to the remote computing device of the distribution network may be large enough to be hampered by battery, hardware, software, and/or bandwidth issues which can impose significant costs or delays when the data is transferred over a wireless network, for example, over a cellular data network. In one example, a mobile device measures and collects GPS data and location coordinate data at a given periodicity, such as once a second, 10 times a second, or other periodicity. This periodicity generates a large amount of data. In some embodiments, the location coordinate data can be stored in an NMEA format such as the GPRMC record. In some embodiments, location coordinate data can be transmitted to a remote server at a frequency of once per second, once per minute, or at some other frequency. Due to demands of a wireless network, battery, hardware, bandwidth or the like, in some embodiments, location coordinate data can be recorded and/or sampled more frequently than the periodicity at which the data is transmitted to a remote computer or server. By taking location data more frequently than transmitting the location data, the amount of data transmitted can be reduced. However, this can result in an inaccurate or incomplete picture of the movement of a mobile computing device during a day. In some embodiments, the location coordinate data accumulated for a period of time can be sent to the remote server in a batch, for example, at the end of the day, or when a device is in wired communication with the remote server. In some embodiments, the location coordinates recorded for a period of time can be averaged and sent to a remote computer or server.

As an example, if a mobile device is used for approximately 8 to 10 hours over the course of one day, the mobile device collects between 28,800 and 36,000 data records. Raw location coordinate data, such as GPRMC records may vary in length, but are typically approximately 90 bytes long. Thus, 8 to 10 hours of use may result in between 2.6 MB and 3.24 MB of data that must be transferred to the remote computing system. In addition, location GPRMC data is not the only data that mobile devices are transmitting. They are also transmitting scan data, receiving notifications, and more. The distribution network may have many carriers. In the case of the USPS, there are more than 340,000 postal carriers. If each carrier's mobile device is generating data records and transmitting, the amount of data to be transmitted is very large. Accordingly, it may be desirable to reduce the amount of data to be transferred, while still sending the same number of GPS location coordinate data records and without unduly delaying the transfer of data to the remote computing system, or through compression, being able to send location coordinate data records at an increased frequency. Although the following example embodiments will be described with reference to mobile devices within a distribution network, it will be understood that the systems and methods described herein may equally be used for data compression in any mobile device.

FIG. 1 schematically illustrates components of a distribution network 100 including a plurality of mobile devices 110. The distribution network 100 includes the plurality of mobile devices 110, a server 140, and a data store 150. The distribution network 100 may include any number of mobile devices 110 suitable for the scale of operation of the distribution network. For example, an interstate, nationwide, or international distribution network such as the United States Postal Service, may include hundreds of thousands of mobile devices 110, some or all of which may be in simultaneous operation as item carriers pick up and deliver items.

The mobile devices 110 include a GPS receiver or other receiver configured to receive signals from GPS satellites 120 or other radionavigation-satellite service (RNSS) signal. The mobile devices 110 are further in communication with a remote server 140 or other remote computing system, such as a central, regional, or local data center, via a wired or wireless network 130. The remote server 140 is in communication with a data store 150 which may store GPS data, accelerometer data, and/or other location or utilization data received at the server 140 from the mobile device 110. The server 140 may further be configured to process GPS or accelerometer data received from the mobile devices 110. For example, if data received at the server 140 is compressed as will be described in greater detail herein, the server 140 may be configured to perform one or more extraction or decompression algorithms prior to and/or subsequent to storing the data in the data store 150. In some embodiments, the data store 150 may store the GPS or accelerometer data in a compressed format such that other downstream systems accessing the data may individually extract or decompress the data, further reducing the processing workload on the server 140.

Figure 2:
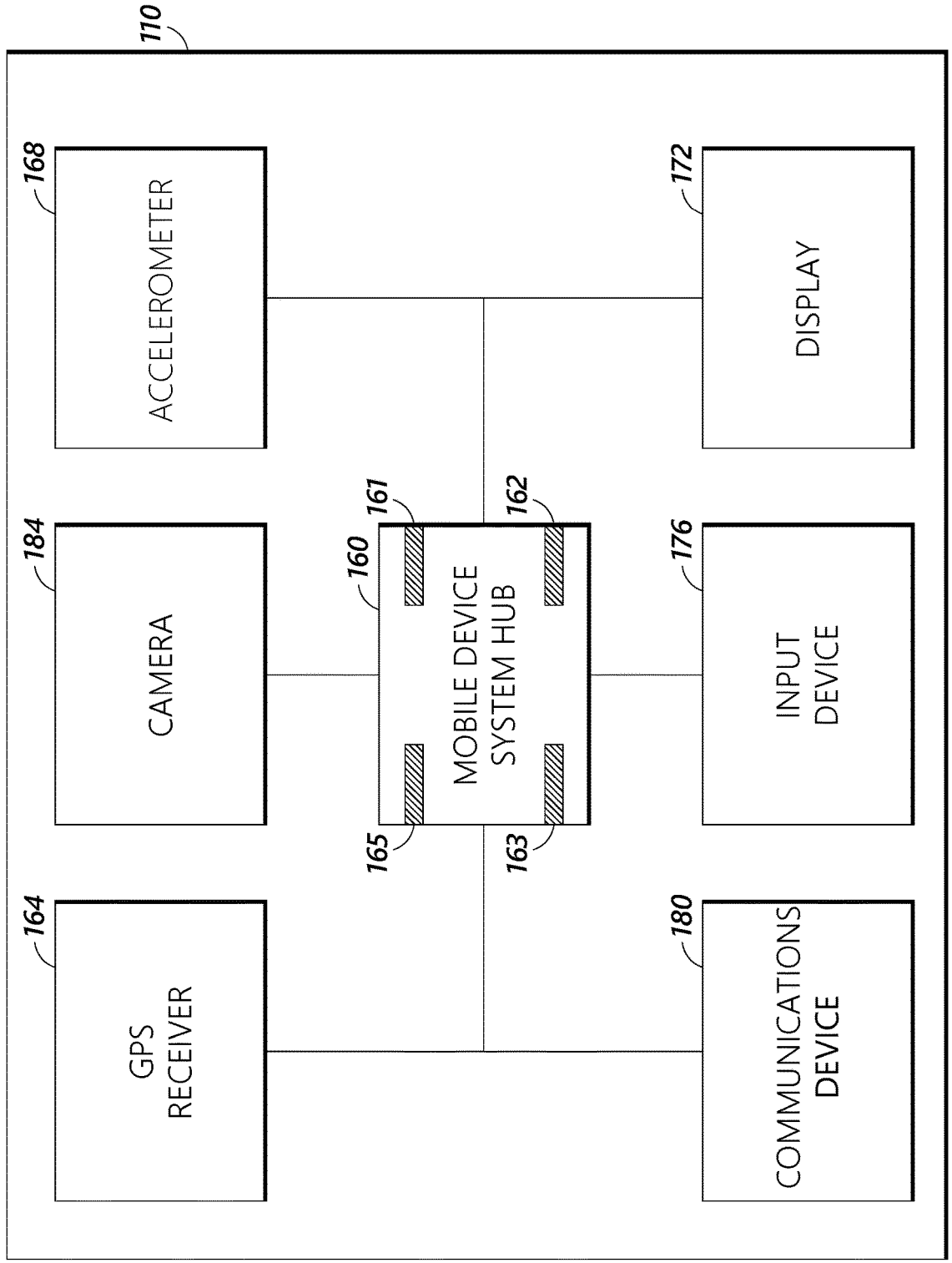
FIG. 2 is a block diagram schematically illustrating components of an example mobile device.

FIG. 2 is a block diagram schematically depicting example components of a mobile device 110. The mobile device 110 may be, for example, any one of the mobile devices 110 illustrated in FIG. 1. In some embodiments, the mobile device 110 can include a system hub 160, a GPS receiver 164, an accelerometer 168, a display 172, an input device 176, a communications device 180, and a camera 184.

The system hub 160 may comprise or be a component of a processing system implemented with one or more processors. The system hub 160 may include a network of interconnected processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 160 may comprise a processor 161 such as, for example, a microprocessoran ARM or MIPS® processor, a Qualcomm Snapdragon® processor, a microcontroller, an Intel single or multiple core processor, such as i9®, i7®, i5®, or i3® processors, Apple A12, A14, etc. processors, Exynos processor, AMD Ryzen®, Phenom®, Athlon®, A-Series®, or FX® processor, or the like. The processor 161 typically has conventional address lines, conventional data lines, and one or more conventional control lines. The processor 161 may be in communication with a processor memory 162, which may include, for example, RAM memory, flash memory, ROM memory, EPROM memory, EEPROM memory, registers, hard disk, a removable disk, a CD-ROM, or any other form of storage medium known in the art. The processor memory 162 may include, for example, software, at least one software module, instructions, steps of an algorithm, or any other information. In some embodiments, the processor 161 performs processes in accordance with instructions stored in the processor memory 162. These processes may include, for example, controlling features and/or components of the mobile device 110, and controlling access to and from, and transmitting information and data to and from the system hub 160 and the constituent components of the mobile device 110, as will be described herein.

The system hub 160 comprises a system memory 163, configured to store information, such as data received from the GPS receiver 164, the accelerometer 168, the input device 176, the communications device 180, and/or the camera 184. The system memory 163 may comprise a database, a comma delimited file, a text file, or the like. The system hub 160 is configured to coordinate and direct the activities of the components of the mobile device 110.

In some embodiments, the processor 161 is connected to a communication feature 165. The communication feature 165 is configured for wired and/or wireless communication. In some embodiments, the communication feature 165 communicates via telephone, cable, fiber-optic, or any other wired communication network. In some embodiments, the communication feature 165 may communicate via cellular networks, WLAN networks, or any other wireless network. The communication feature 165 is configured to receive instructions and to transmit and receive information among components of the mobile device 110, and in some embodiments, with a remote server (not shown) or the databases, or other resources outside the mobile device 110, as desired.

In some embodiments, the various components of the mobile device 110 such as the GPS receiver 164, the accelerometer 168, the display 172, the input device 176, the communications device 180, or the camera 184 can be configured to use the processor 161, processor memory 162, system memory 163, or communications feature 165 or other components of the mobile device system hub 160, or to have their own memory, processor, system memory, or communications feature or other components as desired.

The GPS receiver 164 is in communication with GPS satellites and can discover the specific location of the mobile device 110 through its communications with the GPS satellites 120 as shown in FIG. 1. In some embodiments the GPS receiver 164 uses other position determining systems to determine its exact location, such as GLONASS, COMPASS, multilateration, Wi-Fi detection, triangulation, or LORAN. In some embodiments, the GPS receiver 164 records the location of the mobile device 110 periodically, such as at a specific time interval (e.g., at 0.01 seconds, 0.1 seconds, every 0.5 seconds, every second, every 2 seconds, every 5 seconds, every 10 seconds, every 30 seconds, every 60 seconds, or at any other suitable time interval). When the GPS receiver 164 determines the location of the mobile device 110, the GPS receiver 164 creates a location data record which is stored in internal memory of the GPS receiver 164 and/or in the system memory 163. In some embodiments, the system memory 163 stores a database file, comma delimited file, or text file of location data records, and the GPS receiver 164 may cause an additional location data record to be added to the file of location data records each time the GPS receiver 164 determines the location of the mobile device 110. The location data records may be stored in accordance with any suitable location data record format, for example, an NMEA format such as GPRMC records.

The accelerometer 168 is configured to measure acceleration of the mobile device 110. In some embodiments, the accelerometer 168 is configured to measure acceleration in three dimensions, such as x, y, and z axes. In some embodiments, the accelerometer can be or include a gyroscope. The accelerometer 168 may be any suitable type of accelerometer as commonly included in consumer electronic devices. In some embodiments, the accelerometer 168 records the measured acceleration of the mobile device 110 periodically, such as at a specific time interval (e.g., every 0.05 seconds, every 0.1 seconds, every 0.5 seconds, every second, or at any other suitable time interval). When the accelerometer 168 determines the acceleration of the mobile device 110, the accelerometer 168 creates an acceleration data record which is stored in internal memory of the accelerometer 168 and/or in the system memory 163. In some embodiments, the system memory 163 stores a database file, comma delimited file, or text file of acceleration data records, and the accelerometer 168 may cause an additional acceleration data record to be added to the file of acceleration data records each time the accelerometer 168 determines the acceleration of the mobile device 110. The acceleration data records may be stored in a format that stores x, y, and z-axis acceleration values in association with a device time corresponding to the acceleration measurement.

In some embodiments, the mobile device 110 can also include a display 172. In some embodiments, display 172 is a display screen, touch screen, or other method of displaying information. In some embodiments, the display 172 can display information to the user. For example, the display 172 can display information to alert or instruct an item carrier, information to instruct the item carrier regarding a delivery or pickup location, or the like.

In some embodiments, the mobile device 110 can also include an input device 176.

The input device 176 can be a key board, touch screen, or the like. For example, a touch screen may comprise both the display 172 and the input device 176. The input device 176 can be used by the user of the mobile device 110, such as an item carrier, to control the operations of the mobile device 110.

In some embodiments, the mobile device 110 can also include a communications device 180. In some embodiments, the communications device 180 may communicate via cellular networks, WLAN networks, or any other wireless or wired network. The communications device 180 can be used to receive or send information to the server 140 of FIG. 1, or any other remote computing system that the mobile device 110 may need to communicate with. For example, the communications device 180 may be used to periodically send GPS location data and/or acceleration data from the system memory 163 to the server 140 (e.g., once per second, every 5 seconds, every 10 seconds, every 30 seconds, every minute, every two minutes, every five minutes, every 10 minutes, or any other suitable time interval).

In some embodiments, the mobile device 110 can also include a camera 184. In some embodiments, camera 184 can be used to capture images. Images may be stored in the system memory 163. In some embodiments, the camera 184 can be used to scan barcodes, QR codes, or other visual identifiers, such as on labels affixed to items being picked up or delivered. The mobile device 110 can then use this information to identify items that are being delivered or picked up. In some embodiments, the mobile device 110 can use a dedicated scanner instead of the camera to scan barcodes, QR codes, or other visual identifiers.

Figure 3:
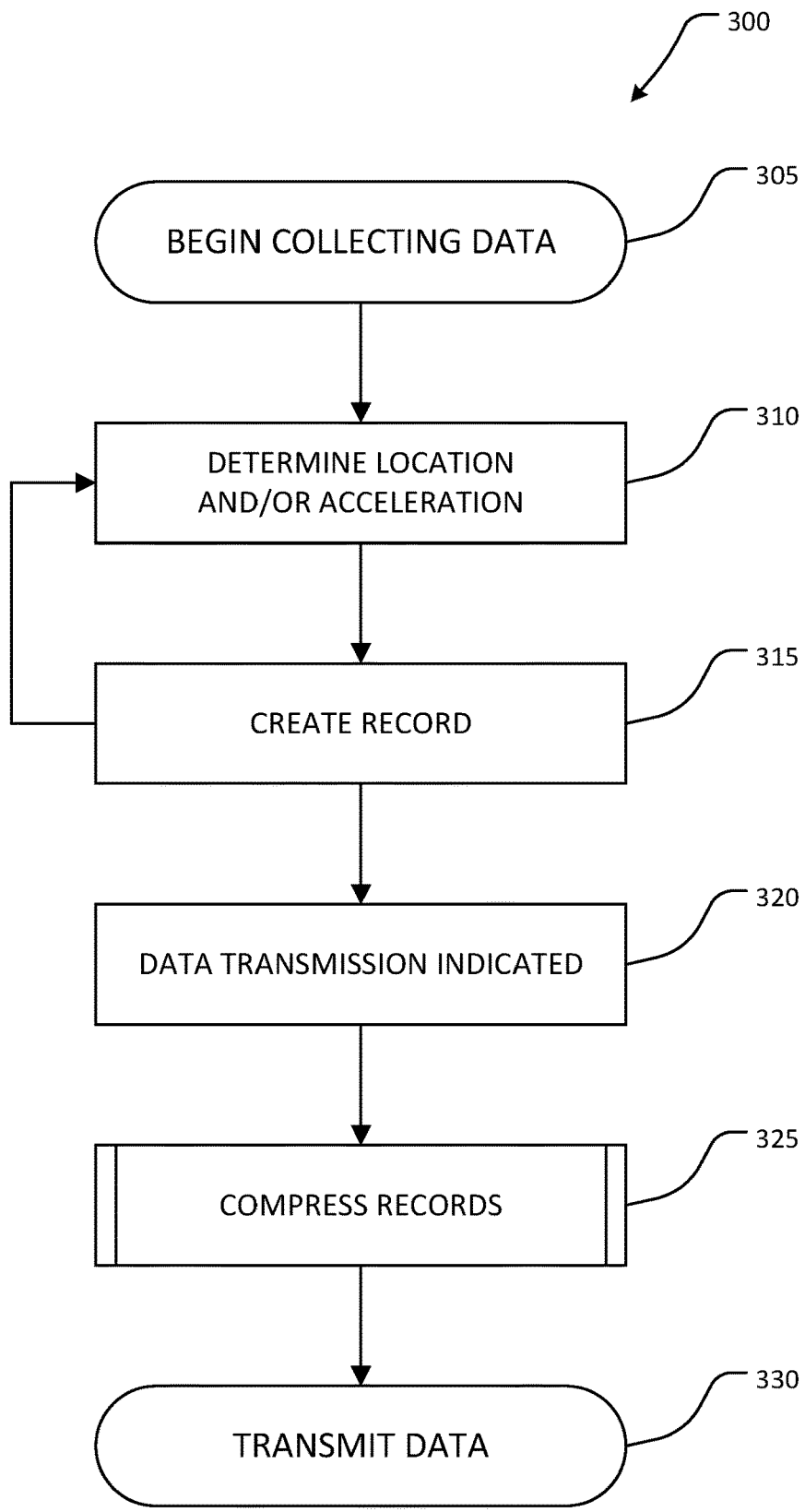
FIG. 3 is a flow chart illustrating an example method of collecting and transmitting location data and/or acceleration data.

FIG. 3 is a flow chart illustrating an example method 300 of collecting and transmitting location data and/or acceleration data. The method 300 may be performed by any mobile device capable of obtaining and transmitting location data and/or acceleration data. For example, the method 300 may be performed by the mobile device 110 of FIGS. 1 and 2. The method 300 may be performed repeatedly any number of times as data is collected. For example, the mobile device 110 may perform the method 300 once over each time period corresponding to the time interval of data reporting (e.g., once per minute if the mobile device 110 is configured to transmit data to a remote computing system such as the server 140 once per minute).

The method 300 begins at block 305, when a mobile device 110 begins collecting location data and/or acceleration data. For example, the mobile device 110 may begin collecting location data and/or acceleration data when it is powered on for the first time on a particular day, when an item carrier begins a route while carrying the mobile device 110, or at any other time. In some embodiments, the mobile device 110 may be configured to automatically begin collecting location data and/or acceleration data based on the movement or location of the mobile device 110, or the mobile device may begin collecting data at block 305 in response to an input received at the input device 176 such as a button or touchscreen input from the item carrier in possession of the mobile device 110. When the mobile device 110 has begun collecting location data and/or acceleration data, the method 300 continues to block 310.

At block 310, the mobile device 110 determines the location coordinates of the mobile device 110, and/or records acceleration information for the mobile device 110 using the accelerometer 168. Location data may be determined by the GPS receiver 164 based on signals received from one or more satellites 120. Acceleration data may be determined by the accelerometer 168 based on acceleration measured at one or more sensors within the accelerometer 168. Location data and/or acceleration data may be sent from the GPS receiver 164 and/or the accelerometer 168 to the system memory 163. In some embodiments, the determined GPS location data sent from the GPS receiver to the system memory 163 may be in a standard GPS data format, such as an NMEA format (e.g., a GPRMC record). The acceleration data may include one or more directional acceleration quantities, such as x-, y-, and z-direction acceleration values (e.g., in m/s$^2$ or other suitable acceleration unit), as well as a device timestamp corresponding to a device time of the mobile device 110 when the acceleration measurement was determined. When location data and/or acceleration data has been determined, the method 300 continues to block 315.

At block 315, the mobile device 110 creates a record corresponding to the determined location data or acceleration data. For example, a component of the mobile device 110 such as the processor 161 may cause an entry to be added to a location data log file (e.g., a database file, comma delimited file, text file, or the like) or to an acceleration data log file (e.g., a database file, comma delimited file, text file, or the like) stored in the system memory 163. The new log file entry corresponding to the newly determined acceleration or location data record may be added as an additional record in a database file, as one or more comma delimited values appended to the end of a text file, etc., such that the item of location data or acceleration data determined at block 310 is stored as the most recent item in the corresponding log file in the system memory 163. After the record has been created, the method 300 may return to block 310 to determine the next location data point or acceleration data point. After repeating blocks 310 and 315 for a suitable time period, the method 300 continues to block 320.

At block 320, the mobile device 110 determines that a data transmission is indicated. The mobile device 110 may determine that a transmission is indicated in accordance with a predetermined data reporting time interval. For example, the mobile device 110 may determine that a transmission is indicated when the predetermined time interval has elapsed since the last transmission of location data or acceleration data (e.g., a mobile device 110 configured to transmit location data every minute may determine that a transmission is required at block 320 when one minute has elapsed since a timestamp associated with the most recent location data transmission). In some embodiments, the mobile device 110 may determine that a transmission is indicated based on a count of location data or acceleration data records. For example, the processor 161 of a mobile device 110 configured to determine the device location and create a record every second may increment a record counter each time a record is added to a log file at block 315, and may determine that a transmission is indicated at block 320 each time the counter reaches a multiple of 60 so as to initiate a transfer every minute. When the mobile device 110 determines that a transmission is indicated, the method 300 continues to sub-process 325. In some embodiments, the data transmission is indicated at a given time based on a clock signal. In some embodiments, the data transmission can be indicated each time location and/or acceleration data is recorded.

At sub-process 325, the mobile device 110 compresses the records that will be transmitted. As will be described in greater detail with reference to FIGS. 4-7, the mobile device 110 may compress the location data and/or acceleration data records by various methods that reduce the number of bytes to be transmitted. If the log file includes records obtained prior to the previous data transmission, the mobile device may isolate only the new records that have been added to the log file since the initiation of the previous data compression and transmission. When the records to be transmitted have been compressed at sub-process 325, the method 300 continues to block 330.

At block 330, the method 300 terminates as the mobile device 110 transmits data to a remote computing system. The transmitted data includes the compressed location data and/or acceleration data. The remote computing system may be, for example, the server 140 illustrated in FIG. 1. The mobile device 110 may transmit the data to the remote computing system by any suitable wired or wireless transmission method, such as using a cellular data network, via the internet or any other suitable public or private network. The mobile device 110 may continue repeating the method 300 indefinitely to continue collecting, storing, compressing, and transmitting location data and/or acceleration data.

Location Data Compression

As described above, mobile devices such as the mobile devices 110 of the distribution network 100 may determine GPS location data records, and may send the GPS location data to a remote computing device such as the server 140 and/or the data store 150 of the distribution network 100. In some example implementations, such as for mobile devices carried by distribution network item carriers, the mobile devices may generate large amounts of GPS data each day storing location data as GPRMC records. However, it may be desirable to transmit most or all records to a remote computing system while limiting the total amount of data transferred, such as to less than one megabyte or a fraction thereof (e.g., less than 500 kilobytes, less than 250 kilobytes, etc.) per day.

Accordingly, the GPS information may be compressed in order to reduce the amount of data required to send large numbers of GPS location information points from a mobile device to a remote computing system. In some aspects, the mobile devices 110 of the distribution network 100 may automatically perform such GPS data compression. In various embodiments, the data compression methods described herein may be performed continuously, such as for each GPS record as it is captured, may be performed periodically on a set of GPS data records, such as every 10 seconds, every 30 seconds, every minute, every 5 minutes, every 10 minutes, or at any other suitable time interval. In other embodiments, the compression of GPS data may be performed on an event-based schedule. For example, GPS records may be determined and stored at a mobile device in a standard format such as the NMEA format until a set of records are to be sent to the remote computing device, and the full set of records may be compressed shortly before the transmission of GPS data occurs. The compression methods described herein may reduce location coordinate data records or other data records from an average size of approximately 90 bytes per record to an average size of approximately 9.14 bytes per record, such that 8-10 hours of GPRMC records obtained at a rate of one record per second will result in only 263 kilobytes to 329 kilobytes of data. Further compression may be achieved using data compression methods such as GZIP or the like.

An example set of data records is provided in Table 1 below. The set of six data records provided in Table 1 is relatively small and is provided for illustrative purposes. It will be understood that significantly larger data sets, including tens, hundreds, thousands, or millions of records, or more, may be compressed using the same methods disclosed herein.

TABLE 1

Example data records 08-02-2018 15:59:46.228|$GPRMC,155949.00,A,2756.93981,N,08229.49572,W,0.004,,020818,,,D*65|
08-02-2018 15:59:47.223|$GPRMC,155950.00,A,2756.93979,N,08229.49572,W,0.018,,020818,,,D*67|
08-02-2018 15:59:48.234|$GPRMC,155951.00,A,2756.93977,N,08229.49573,W,0.037,,020818,,,D*64|
08-02-2018 15:59:49.233|$GPRMC,155952.00,A,2756.93971,N,08229.49572,W,0.061,,020818,,,D*63|
08-02-2018 15:59:50.226|$GPRMC,155953.00,A,2756.93965,N,08229.49568,W,0.018,74.91,020818,,,D*62|
08-02-2018 15:59:51.236|$GPRMC,155954.00,A,2756.93961,N,08229.49574,W,0.018,359.52,020818,,,D*6D|

The fields included in each GPRMC data record are provided in Table 2 below. Note that some fields may be omitted from any particular GPRMC data record.

TABLE 2

Data record fields

| Field Name | Description | Format |
|---|---|---|
| Device Time | Local time of device (hour/minute/second) | mm-dd-yyyy hh:mm:ss.sss |
| Record Type | NMEA GPS record type | $GPRMC |
| UTC Time | Time of fix in UTC (hour/minute/second) | hhmmss.ss |
| Validity | Whether GPS fix is valid | A = valid, V = invalid, NULL |
| Latitude | Latitude of GPS fix (degrees/minutes) | ddmm.mmmmm, NULL |
| North/South | Northern or Southern hemisphere | N = north, S = south, NULL |
| Longitude | Longitude of GPS fix (degrees/minutes) | ddmm.mmmmm, NULL |
| East/West | Eastern or Western hemisphere | E = east, W = west, NULL |
| Speed | Ground speed (knots) | Decimal (6.3), NULL |
| Course | Direction of travel (degrees) | Decimal (5.2), NULL |
| UTC Date | Date of fix in UTC (day/month/year) | ddmmyy |
| Variation | Magnetic variation (degrees) | Decimal (5.2), NULL |
| Variation E/W | Direction of magnetic variation | E = east, W = west, NULL |
| Mode | GPS fix mode | N = data not valid<br>A = autonomous mode<br>D = differential mode<br>E = estimated mode |
| Checksum | Record checksum | *## |

Figure 4:
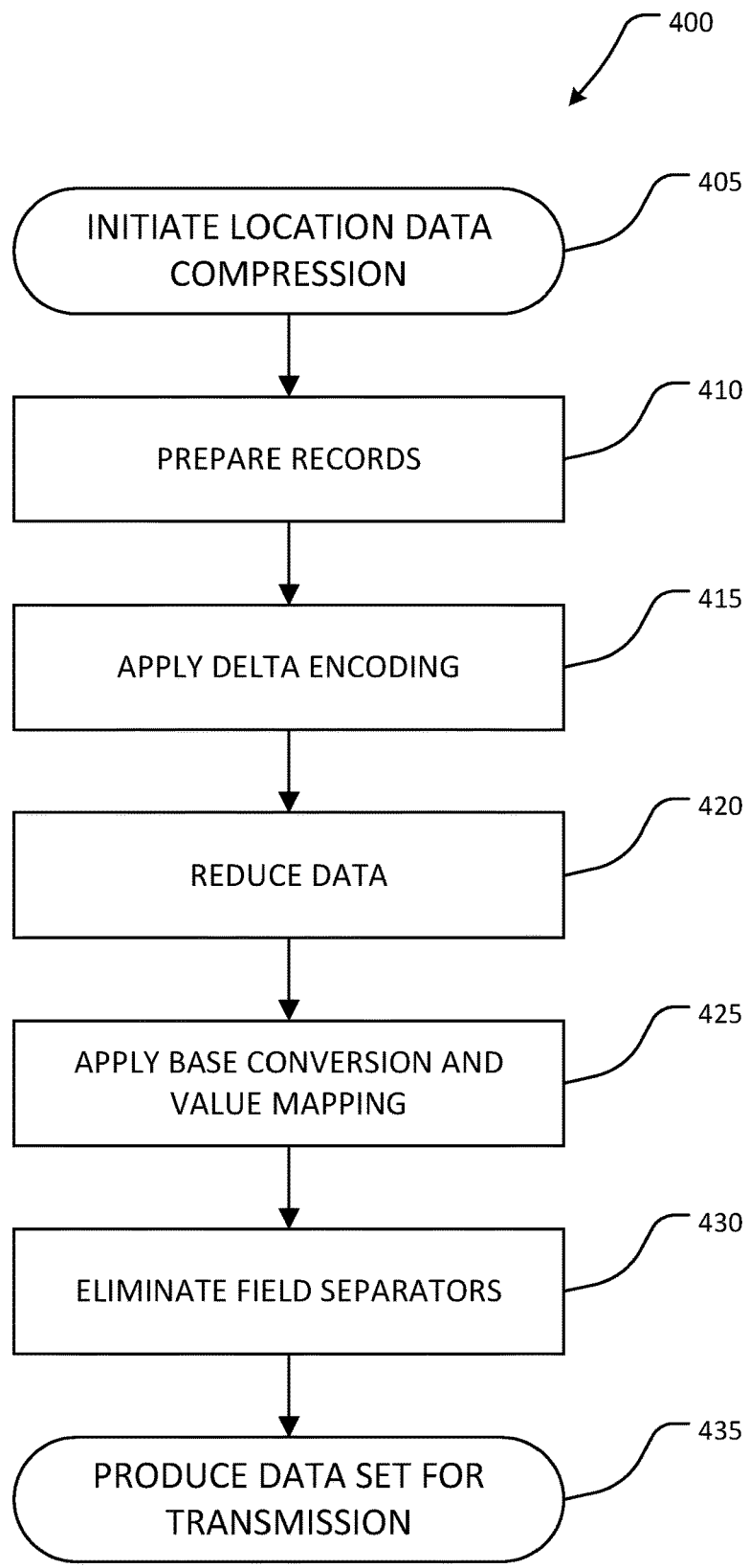
FIG. 4 is a flow chart illustrating an example method of compressing GPS location data records.

FIG. 4 is a flow chart illustrating an example method 400 of compressing GPS location data records. The method 400 may be performed by any mobile device capable of obtaining and transmitting location data. For example, the method 400 may be performed by the mobile device 110 of FIGS. 1 and 2. The method 400 may be performed repeatedly any number of times as data is collected. For example, the mobile device 110 may perform the method 400 once each time a set of collected data is prepared for transmission. In some embodiments, the method 400 may be performed as subprocess 325 of the method 300 described above with reference to FIG. 3.

The method 400 begins at block 405, when GPS data compression is initiated. In some embodiments, GPS data compression may be initiated in the context of method 300 described above with reference to FIG. 3. For example, GPS data compression may be initiated when the method 300 proceeds to subprocess 325. When GPS data compression has been initiated, the method 400 continues to block 410.

At block 410, GPS data records are prepared for compression. The processor 161 or other component of the mobile may transform a list or table of raw GPS data records using one or more preparation steps, for example, to reduce the number of fields in each record, eliminate unnecessary information (e.g., information that is not intended to be collected and/or information that is the same for all records in the set), reduce the number of different characters used, or the like. In some embodiments, the processor 161 receives a set of data records and performs one or more of the following example data preparation steps. In one example, the processor 161 identifies and removes from the set all records in the set having a "V" or NULL value in the Validity field (e.g., all records that do not have an "A" in the validity field). Because only "A" records contain valid GPS data, the records having a "V" or NULL Validity value need not be transmitted with the GPS data. In another example, the Record Type field may be deleted from all records, as all records in the set are set as the same type, e.g., GPRMC type records, rendering the $GPRMC string redundant. In another example, the Speed field and/or the Course field may be rounded to a desired decimal place, such as to decimal (4,1) (e.g., to the nearest 1/10 knot or 1/10 degree) and NULL values may be replaced with "0", as the additional precision provided by three decimal places may be unnecessary. In another example, the Variation and Variation E/W fields may be deleted from all records, for example, in the case of a mobile device 110 that is not configured to capture magnetic variation data. In another example, the vertical bar field separator ("|") may be replaced with a comma or a semicolon (e.g., may be replaced by a comma between the Device Time and Record Type fields, and by a semicolon at the end of each record). In another example, the original checksum value may be deleted from the end of each record. Because each record is being modified, the original checksum becomes invalid, and may be replaced by a new checksum at the end of the GPS data compression, if desired. The example block of data records of Table 1, as transformed by performance of all of the example steps above, is shown in Table 3 below.

TABLE 3

Example data records following data preparation 08-02-2018 15:59:46.228,155949.00,A,2756.93981,N,08229.49572,W,0,,020818,D;
08-02-2018 15:59:47.223,155950.00,A,2756.93979,N,08229.49572,W,0,,020818,D;
08-02-2018 15:59:48.234,155951.00,A,2756.93977,N,08229.49573,W,0,,020818,D;
08-02-2018 15:59:49.233,155952.00,A,2756.93971,N,08229.49572,W,0.1,,020818,D;
08-02-2018 15:59:50.226,155953.00,A,2756.93965,N,08229.49568,W,0,74.91,020818,D;
08-02-2018 15:59:51.236,155954.00,A,2756.93961,N,08229.49574,W,0,359.52,020818,D;

Accordingly, the more compact record format for the prepared GPS data in the example of Table 3 above is provided in Table 4 below.

TABLE 4

Prepared data record fields

| Field Name | Description | Format |
|---|---|---|
| Device Time | Local time of device (hour/minute/second) | mm-dd-yyyy hh:mm:ss.sss |
| UTC Time | Time of fix in UTC (hour/minute/second) | hhmmss.ss |
| Validity | Whether GPS fix is valid | A = valid, V = invalid, NULL |
| Latitude | Latitude of GPS fix (degrees/minutes) | ddmm.mmmmm, NULL |
| North/South | Northern or Southern hemisphere | N = north, S = south, NULL |
| Longitude | Longitude of GPS fix (degrees/minutes) | ddmm.mmmmm, NULL |
| East/West | Eastern or Western hemisphere | E = east, W = west, NULL |
| Speed | Ground speed (knots) | Decimal (6.3), NULL |
| Course | Direction of travel (degrees) | Decimal (5.2), NULL |
| UTC Date | Date of fix in UTC (day/month/year) | ddmmyy |
| Mode | GPS fix mode | N = data not valid<br>A = autonomous mode<br>D = differential mode<br>E = estimated mode |

When the raw data records have been prepared for compression, the method 400 continues to block 415.

At block 415, the processor 161 applies delta encoding to further reduce the size of the GPS data records. Some or all of the fields having numerical values may be converted from their original values to differential values calculated relative to the preceding record. For example, the number valued fields of the first record in the set of records may be left as whole values to serve as a starting point from which the delta values are calculated. In various embodiments one or more, up to all, of the numerical values in the GPS records may be compressed using delta encoding. In the example prepared GPS data records of Table 3 above, the Device Time, UTC Time, Latitude, Longitude, Speed, Course, and UTC Date fields all have numerical values and can be converted to smaller delta values using delta encoding. Additionally, the decimal points in decimal values may be shifted such that each delta value is stored as an integer value to further simplify the records. In an example algorithm in which all numerical fields other than course are modified by delta encoding and decimal values are converted to integers, the prepared GPS data records of Table 3 would be converted to the delta encoded format provided in Table 5 below. In the example records of Table 5, spaces are inserted following certain entries and prior to the following comma delimiting characters. These extra spaces are included for illustrative clarity, to vertically align corresponding record fields, and may not be present in actual delta encoded records produced in accordance with the present technology. For example, although the record in line 2 of Table 5 is shown as "995,100,A,-20,,N,W,0,,,D;" the corresponding record may be stored as "995,100,A,-20,N,,W,0,,,D;" in an actual implementation.

value may change significantly from one value to the next. In the example data of Table 5, the total amount of data in the reduced records is about ⅓ the size of the original GPS data records as shown in Table 1. When the GPS data records have been delta encoded, the method 400 continues to block 420.

In some embodiments, encoding of the data can be accomplished using methods in addition to or instead of delta encoding. For example, one GPS location data point from Table 3 has a value of 2756.93981, N, 08229.49572, W. This can be read to mean 27 degrees 56.93981 minutes, or 56 minutes, 56.3886 seconds. In order to reduce the amount of data transmitted to the server 140, the processor 161 can encode the data using a truncation feature. For example, one degree of latitude is about 69 miles, one minute of latitude is 6068 feet, or 1.15 miles. One-tenth of a minute of latitude is equal to 60.68 feet, and one second of latitude equals 80 feet. The distance between longitude lines varies from north to south.

A carrier may traverse a fixed route, or may follow a route that stays mainly or entirely within a geographic area. The geographic area in which a carrier operates may not include any minute lines, or degree lines. In this case, the minutes field of the GPS location may not change regardless of where in the area the carrier goes. In other geographic areas, a minute line, or a degree line may run through the geographic area, and a carrier may cross the minute or degree line one or more times as the carrier traverses a route. In this case, the degrees and/or minutes would change each time the carrier crosses the line.

The processor 161 can analyze a carrier's route, and/or the geographic area in which the carrier travels, and identify latitude and longitude lines that the carrier is likely to cross,

TABLE 5

Example data records following delta encoding

| 08-02-2018 15:59:46.228, | ,155949.00, | ,A,2756.93981 | ,N,08229.49572 | ,W,0 , | ,020818 | ,D; |
|---|---|---|---|---|---|---|
| 995 | ,100 | ,A,-20 | ,N, | ,W,0 , | , | ,D; |
| 1011 | ,100 | ,A,-20 | ,N,10 | ,W,0 , | , | ,D; |
| 999 | ,100 | ,A,-60 | ,N,-10 | ,W,1 , | , | ,D; |
| 993 | ,100 | ,A,-60 | ,N,-40 | ,W,-1,749 , | | ,D; |
| 1010 | ,100 | ,A,-40 | ,N,60 | ,W,0 ,3595 , | | ,D; |

In some embodiments, it may be desirable not to use delta encoding with regard to the course value because the course value often is not necessarily recorded for every data record, and thus frequently is not present. When present, the course or is unlikely to cross. For example, if a carrier does not cross a particular minute line of latitude or longitude throughout the route, the degrees and minutes fields in the GPS data will not change for any location on the route. So, if the carrier is assigned to a route which includes the GPS location 2756.93981 N, 8229.49572 W, the carrier may not cross the 27 degree line, as the 28 degree line is about 69 miles away, and the carrier's route does not travel that far. In that case, the processor 161 can, for a given mobile delivery device in a known area, omit the numeral places which do not change over the route. So, in this example, the processor 161 in step 415, can truncate the 27 in the degree's place, as it will not change. The "27" in the latitude coordinate, or whatever values do not change, for the given mobile device degrees can be transmitted an initial time when the mobile delivery device is first operated on the route, or the server 140 can determine what the degrees for the GPS location would be based on the identity of the mobile device assigned to a given route. The same process can occur for the minutes place, e.g, the "56" in the latitude example above, or for any other digits in the latitude or longitude measurements.

In some embodiments, the mobile device can determine whether a particular line of latitude or longitude will be crossed, once or frequently, as a carrier travels an assigned route based on input regarding the carriers route. For example, in some embodiments, when a carrier logs in to a mobile computing device, or when a carrier identifies a route to be travelled via the input device 176, the route information for that route can be obtained from the memory 162 or from a remote system. The route information received can include the latitude/longitude values or other coordinate values for the extreme ends of the route, or the extremes of travel between the most distant points on the route, both in a north-south direction and in an east-west direction. If between the most distant points there is a major line latitude or longitude, such as a degree line or a minute line, the processor 161 can determine whether to truncate or exclude the value in the degree's place, the minute's place, etc. The location data transmitted from the processor 161 can include a message that the degree line or minute line is the same for each data record and will only transmit that value once. In some embodiments, the processor 161 can check each record for a change in the degree's place or the minute's place. If no change occurs, the prepared record can truncate the degree's or minute's place for the records where that value does not change. When the value does change, the processor 161 can include the changed value in the next record.

In some embodiments, where a device frequently crosses a degree or minute line, such as the 27 degrees or 56 minutes in the latitude example above, the 56 may not be truncated, but may still be reduced, converted, and transmitted to the server 140 as described herein.

In some embodiments, the truncation or adjustment of GPS location data described herein can be performed prior to performing delta encoding as described above.

At block 420, the processor 161 implements further data reduction by removing one or more fields from the delta encoded GPS data records. The fields removed at block 420 may be removed because they are not necessary and/or redundant. In some embodiments, the UTC Time field may be deleted from the delta encoded records, as its value for any of the records may be reproduced based on the corresponding Device Time entries and the UTC Time entry in the initial record. For the same reason, in some embodiments, the Device Time field may be removed from the delta encoded records rather than the UTC Time entry. In another example, the Validity field may be removed, as only type "A" valid records remain in the data set following the data preparation operations of block 410. In another example, the North/South, East/West, and/or UTC Date fields may be removed, as their values may be reproduced based on the series of delta encoded Latitude, Longitude, and Device Time or UTC Time entries and the corresponding entries in the initial record. In an example algorithm in which the UTC Time, Validity, North/South, East/West, and UTC Date fields are all removed from the delta encoded records, the delta encoded records of Table 5 would be converted to the field reduced format provided in Table 6 below. Similar to Table 5, spaces are inserted for clarity of illustration.

TABLE 6

Example data records following field reduction

| | | | | | |
|---|---|---|---|---|---|
| 08–02–2018 15:59:46.228,155949.00 | ,A,2756.93981,N | ,08229.49572,W | ,0 | ,020818 | ,D; |
| 995 | ,–20 | ,0 | ,0 | | ,D; |
| 1011 | ,–20 | ,10 | ,0 | | ,D; |
| 999 | ,–60 | ,–10 | ,1 | | ,D; |
| 993 | ,–60 | ,–40 | ,–1 | ,749 | ,D; |
| 1010 | ,–40 | ,60 | ,0 | ,3595 | ,D; |

Thus, following field reduction at block 420, the data set includes an initial record in the original prepared format as produced at block 410, followed by a series of delta encoded records each including a total of six fields: Device Time, Latitude, Longitude, Speed, Course, and Mode. When the fields of the delta encoded records have been reduced, the method 400 continues to block 425.

At block 425, the processor 161 applies numeric base conversion and value mapping to the numerical value fields to further reduce the size of the GPS data records. In one example base conversion method, the processor converts the integer values from their existing base-10 values to base-62 values. Base-62 encoding may be implemented by utilizing the 10 numerical characters 0-9, the 26 uppercase letter characters A-Z, and the 26 lowercase letter characters a-z as digits, for a total of 62 digit values. A base-10 encoding provides 10 values for one digit, 100 values for two digits, and 1000 values for three digits. In contrast, a base-62 encoding provides 62 possible values for one digit, 3843 possible values for two digits, and 238327 possible values for three digits.

Moreover, the base-62 encoding may be modified such that negative values may be represented without the use of a negative sign. As shown in Table 6 above, most of the values in the delta encoded and field reduced GPS data records are relatively low, for example, smaller than 2000, with some exceptions. Thus, for the Latitude and Longitude delta integer values, 1921 may be added to each delta value such that all integer values between –1921 and 1921 can be represented by a 2-digit base-62 value, eliminating the need to store the negative sign for negative changes in latitude or longitude. Similarly, delta values in the Speed field between –30 and 30 can be represented with a single-digit base-62 value. Because the Device Time delta value is always positive (e.g., subsequent records are always recorded after a positive change in device time), and because the Course values are not delta encoded and thus cannot be negative, the Device Time and Course fields may be directly encoded into base-62 values without adding a constant value. Similarly, for records with a Device Time delta value higher than 3843, Latitude or Longitude delta values outside the range of −1921 to 1921, or Speed delta values outside the range of −30 to 30, those values may be directly encoded into base-62 values without adding a constant value. Thus, in an example algorithm using base conversion and value mapping as described above, the field reduced records of Table 6 would be converted to the base converted format provided in Table 7 below. Similar to Tables 5 and 6, spaces are inserted for clarity of illustration.

TABLE 7

Example data records following base conversion and value mapping

| 08-02-2018 | 15:59:46.228,155949.00,A | ,2756.93981,N | ,08229.49572,W | ,0,,020818 | ,D; |
|---|---|---|---|---|---|
| RM | | ,GV | ,M5 | ,H, | ,D; |
| RS | | ,C5 | ,F7 | ,M, | ,D; |
| SE | | ,1V | ,EX | ,X ,4W | ,D; |
| RL | | ,−MS | ,−5A | ,A ,4Q | ,D; |
| SD | | ,−X2 | ,−2I | ,C ,4S | ,D; |

When the numerical values have been converted to base-62 values, the method 400 continues to block 430.

At block 430, the processor 161 selectively eliminates field separators in the base converted GPS data records to further reduce the size of the records. It has been empirically observed that for typical reduced GPS data records, following the operations of blocks 405-425, approximately 50%-55% of the records have 2-character Device Time, Latitude, and Longitude entries, 1-character Speed entries, and a 1-character Mode entry, with a 2-character Course entry sometimes included between the Speed and Mode entries. These records have a fixed length of 8 or 10 bytes, and can therefore be interpreted without a field separator. Accordingly, field separators may be removed from the 50%-55% of records that follow the fixed 8 or 10 byte formats, with the field separators being retained in the remaining records. In an example algorithm, the base converted records of Table 7 would be converted to the format shown in Table 8 below.

TABLE 8

Example GPRMC data records following field separator elimination 08-02-2018 15:59:46.228,155949.00,A,2756.93981,N,08229.49572, W,0,,020818,D;
RMGVM5HD;
RSC5F7MD;
SE1VEXX4WD;
RL,−MS,−5A,A,4Q,D;
SD,−X2,−2I,C,4S,D;

As shown in Table 8 above, the field separators (e.g., commas) are removed from the second, third, and fourth records, which conform to the 8 or 10 byte formats, while the fifth and sixth records do not conform to the 8 or 10 byte formats and accordingly retain their field separators. Following the selective field separator elimination of block 430, record length has been observed to be approximately 10.14 bytes on average, as compared to approximately 90 bytes per record in the original raw GPRMC data. When field separators have been eliminated as appropriate, the method 400 continues to block 435.

At block 435, the method 400 terminates as the processor 161 produces the final data set for transmission. In some embodiments, the processor 161 computes a new checksum for each record to preserve the integrity of the reduced records and to replace the original checksums in the GPRMC data, which were eliminated at block 410. Various checksum processes, such as a CRC32 checksum or any other suitable checksum process may be used. Each checksum may be appended at the end of the corresponding record in the data set. In some embodiments, the new checksum for each record may be computed based on a previous version of the record, rather than based on the final record for transmission. For example, in some embodiments the new checksum is calculated based on prepared records generated at block 410 (e.g., the records shown in Table 3), such that the checksum serves as confirmation of the accuracy both for the compression steps of blocks 415-425 and for any subsequent reconstruction performed on the transmitted data. In addition, the processor 161 may perform one or more other compression methods, such as using GZIP or another known data compression protocol, in finalizing the set of GPS data records for transmission.

Figure 5:
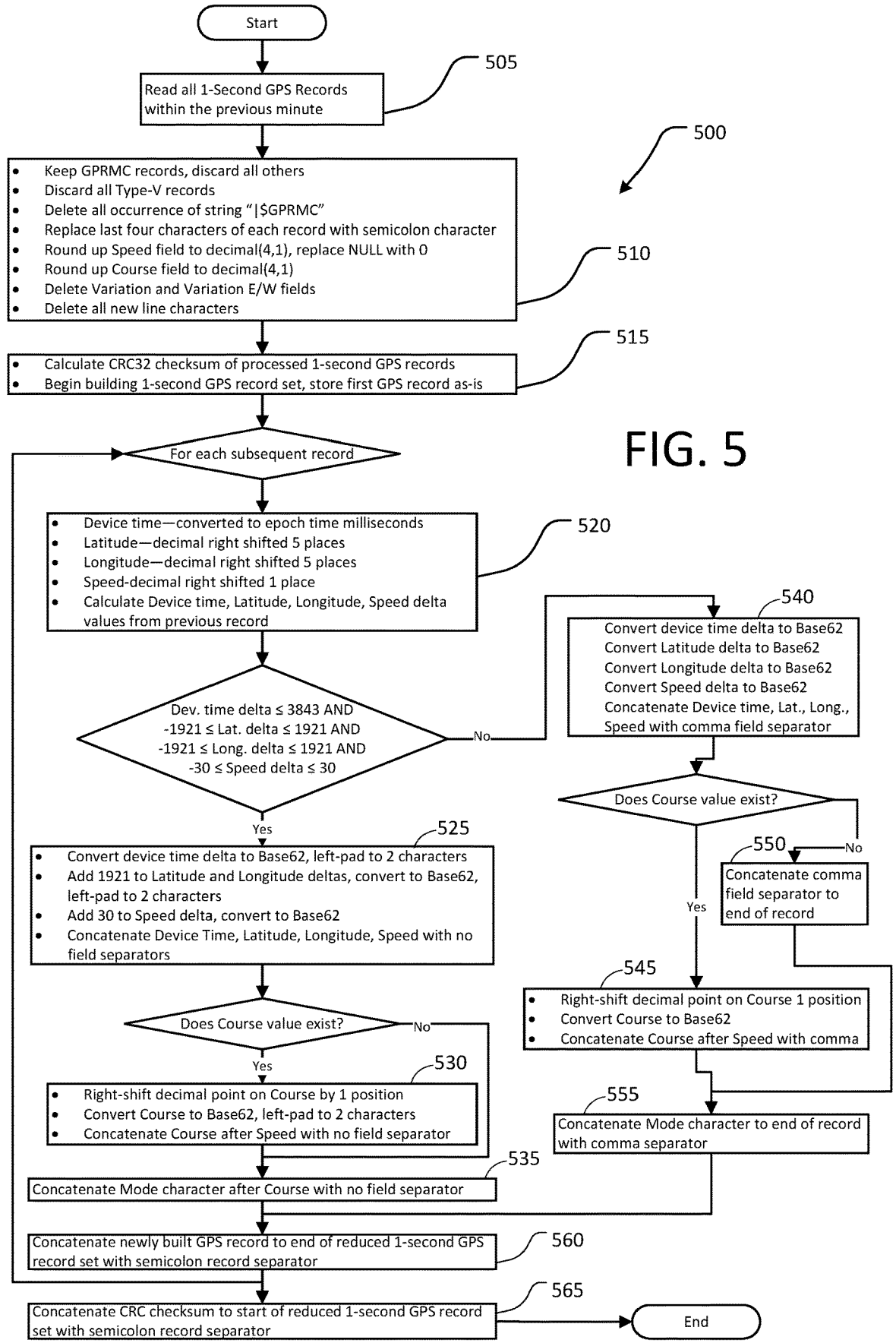
FIG. 5 is a flow chart illustrating a particular example algorithm for compressing location data records.

FIG. 5 is a flow chart illustrating a particular example algorithm 500 for compressing location data records. The algorithm 500 illustrated in FIG. 5 is associated with the method 400 of FIG. 4, and includes the example operations used to convert the initial data set of Table 1 into the final data set of Table 8. The algorithm 500 may be performed by any one or more components of a mobile device such as the mobile device 110, for example, the processor 161 and/or any other circuitry of the mobile device 110. In some embodiments, the processor 161 performs the algorithm 500 periodically before each time a GPS data transfer is scheduled to occur, such as once every 10 seconds, every 30 seconds, every minute, every hour, etc., based on the set of data records recorded at the mobile device 110 since the preceding data transfer. In the algorithm 500, blocks 510 and 515 may correspond to preparing records at block 410 of the method 400; block 520 may correspond to the delta encoding at block 415 of the method 400; blocks 525, 530, 540, and 545 may correspond to the data reduction, base conversion, and value mapping at blocks 425 and 430 of the method 400; blocks 535, 550, and 555 may correspond to the elimination of field separators at block 430 of the method 400; and blocks 560 and 565 may correspond to the production of a data set for transmission at block 435 of the method 400.

Figure 6:
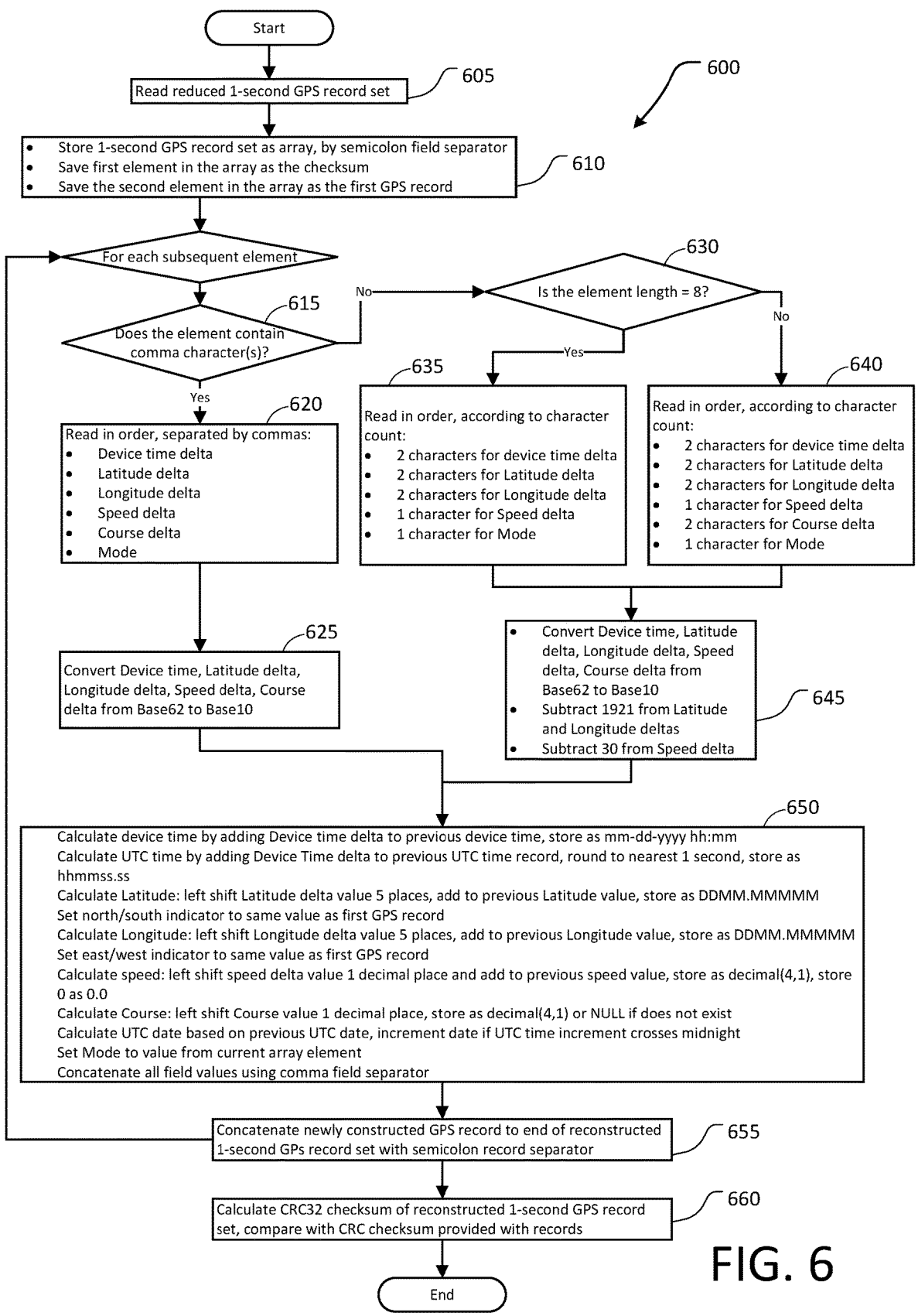
FIG. 6 is a flow chart illustrating a particular example algorithm for decompressing compressed GPRMC location data records.

FIG. 6 is a flow chart illustrating a particular example algorithm 600 for decompressing compressed GPRMC location data records. The algorithm 600 illustrated in FIG. 6 is consistent with a substantially reversed iteration of the algorithm 500 and/or of the method 400, and is suitable for reconstructing a set of prepared data records after the compressed records are received from a mobile device. For example, the algorithm 500 would be suitable for reconstructing the set of prepared data records of Table 3, based on receiving the compressed data set of Table 8, optionally with a new checksum appended to each record. The algorithm 600 may be performed by any one or more computing devices in communication with the mobile device transmitting the compressed GPS data records. For example, in the distribution network example of FIG. 1, the algorithm 600 may be performed by the server 140 based on compressed GPS data received from any or all of the mobile devices 110. In some embodiments, the server 140 causes the compressed records to be stored in the data store 150 in their compressed state for future reconstruction, or the server 140 may reconstruct the data records upon receipt and cause the reconstructed records to be stored in the data store 150. In the algorithm 600, blocks 605 and 610 may correspond to a reverse operation of operations performed in the final production of a data set for transmission at block 435 of the method 400; blocks 615, 620, 630, 635, and 640 may correspond to an analysis of the compressed records accounting for the elimination of some field separators at block 430 of the method 400; blocks 625 and 645 may correspond to a reverse operation of the base conversion and value mapping applied at block 425 of the method 400; block 650 may correspond to reverse operations of the delta encoding and data reduction applied at blocks 415 and 420 of the method 400; and blocks 655 and 660 may correspond to reverse operations of the record preparation at block 410 of the method 400.

Acceleration Data Compression

As described above, mobile devices such as the mobile devices 110 of the distribution network 100 may determine acceleration data records, and may send the acceleration data to a remote computing device such as the server 140 and/or the data store 150 of the distribution network 100. In some example implementations, such as for mobile devices carried by distribution network item carriers, the mobile devices may generate a large quantity of acceleration data. For example, in some embodiments a mobile device 110 may be configured to obtain and record an acceleration data record from an accelerometer 168 or the like, periodically during operation, such as every 0.05 seconds, every 0.1 seconds, every 0.5 seconds, every section, etc. Thus, similar to GPS location data records, a mobile device 110 may generate up to several megabytes of acceleration data each day when the records are stored as full acceleration data records. However, it may be desirable to transmit all records to a remote computing system while limiting the total amount of data transferred, such as to less than one megabyte or a fraction thereof (e.g., less than 500 kilobytes, less than 250 kilobytes, etc.) per day.

Accordingly, the acceleration data may be compressed in order to reduce the amount of data required to send large numbers of acceleration data points from a mobile device to a remote computing system. In some aspects, the mobile devices 110 of the distribution network 100 may automatically perform such acceleration data compression. In various embodiments, the data compression methods described herein may be performed continuously, such as for each acceleration data record as it is captured, may be performed periodically on a set of acceleration data records, such as every 10 seconds, every 30 seconds, every minute, every 5 minutes, every 10 minutes, or at any other suitable time interval. In other embodiments, the compression of acceleration data may be performed on an event-based schedule. For example, acceleration data records may be determined and stored at a mobile device in a full or raw data record format until a set of records are to be sent to the remote computing device, and the full set of records may be compressed shortly before the transmission of acceleration data occurs. Further compression may be achieved using known data compression methods such as GZIP or the like.

An example set of raw acceleration data records is provided in Table 9 below.

TABLE 9

Example raw acceleration data records 01-29-2019 12:17:10.310 |AccOutput: [X = 3, Y = 21, Z = −4]|
01-29-2019 12:17:10.463 |AccOutput: [X = 4, Y = 21, Z = −4]|
01-29-2019 12:17:10.577 |AccOutput: [X = 3, Y = 20, Z = −4]|
01-29-2019 12:17:10.685 |AccOutput: [X = 3, Y = 21, Z = −3]|
01-29-2019 12:17:10.792 |AccOutput: [X = 3, Y = 20, Z = −4]|
01-29-2019 12:17:10.898 |AccOutput: [X = 3, Y = 20, Z = −4]|
01-29-2019 12:17:11.037 |AccOutput: [X = 2, Y = 21, Z = −4]|
01-29-2019 12:17:11.148 |AccOutput: [X = 3, Y = 21, Z = −4]|
01-29-2019 12:17:11.255 |AccOutput: [X = 3, Y = 20, Z = −4]|
01-29-2019 12:17:11.395 |AccOutput: [X = 3, Y = 21, Z = −4]|
01-29-2019 12:17:11.543 |AccOutput: [X = 2, Y = 21, Z = −4]|
01-29-2019 12:17:11.647 |AccOutput: [X = 3, Y = 22, Z = −4]|
01-29-2019 12:17:11.761 |AccOutput: [X = 2, Y = 21, Z = −4]|
01-29-2019 12:17:11.866 |AccOutput: [X = 3, Y = 22, Z = −4]|
01-29-2019 12:17:11.971 |AccOutput: [X = 2, Y = 20, Z = −3]|
01-29-2019 12:17:12.076 |AccOutput: [X = 3, Y = 21, Z = −4]|
01-29-2019 12:17:12.180 |AccOutput: [X = 2, Y = 21, Z = −4]|
01-29-2019 12:17:12.285 |AccOutput: [X = 4, Y = 20, Z = −3]|
01-29-2019 12:17:12.390 |AccOutput: [X = 2, Y = 21, Z = −4]|
01-29-2019 12:17:12.496 |AccOutput: [X = 3, Y = 20, Z = −4]|
01-29-2019 12:17:12.601 |AccOutput: [X = 3, Y = 21, Z = −5]|
01-29-2019 12:17:12.761 |AccOutput: [X = 3, Y = 20, Z = −3]|
01-29-2019 12:17:13.094 |AccOutput: [X = 3, Y = 20, Z = −4]|
01-29-2019 12:17:13.225 |AccOutput: [X = 4, Y = 21, Z = −5]|
01-29-2019 12:17:13.330 |AccOutput: [X = 3, Y = 20, Z = −4]|
01-29-2019 12:17:13.435 |AccOutput: [X = 2, Y = 22, Z = −5]|
01-29-2019 12:17:13.568 |AccOutput: [X = 3, Y = 20, Z = −4]|
01-29-2019 13:11:31.348 |AccOutput: [X = 2, Y = 20, Z = −4]|
01-29-2019 13:11:31.541 |AccOutput: [X = 4, Y = 21, Z = −4]|
01-29-2019 13:11:31.677 |AccOutput: [X = 3, Y = 21, Z = −5]|
01-29-2019 13:11:31.781 |AccOutput: [X = 4, Y = 21, Z = −4]|
01-29-2019 13:11:31.885 |AccOutput: [X = 3, Y = 20, Z = −4]|
01-29-2019 13:11:31.989 |AccOutput: [X = 1, Y = 20, Z = −3]|
01-29-2019 13:11:32.095 |AccOutput: [X = 3, Y = 21, Z = −4]|
01-29-2019 13:11:32.198 |AccOutput: [X = 4, Y = 22, Z = −4]|
01-29-2019 13:11:32.303 |AccOutput: [X = 2, Y = 20, Z = −4]|
01-29-2019 13:11:32.407 |AccOutput: [X = 3, Y = 21, Z = −4]|
01-29-2019 13:11:32.511 |AccOutput: [X = 4, Y = 20, Z = −3]|
01-29-2019 13:11:32.616 |AccOutput: [X = 2, Y = 22, Z = −3]|
01-29-2019 13:11:32.720 |AccOutput: [X = 3, Y = 21, Z = −4]|
01-29-2019 13:11:32.824 |AccOutput: [X = 3, Y = 21, Z = −4]|
01-29-2019 13:11:32.928 |AccOutput: [X = 3, Y = 21, Z = −4]|

The fields included in each raw acceleration data record are provided in Table 10 below. Note that some fields may be omitted from any particular acceleration data record.

TABLE 10

Acceleration data record fields

| Field Name | Description | Format |
| --- | --- | --- |
| Device Time | Local time of device (hour/minute/second) | mm-dd-yyyy hh:mm:ss.sss |
| 3-axis Acceleration | $m/s^2$ for each axis between −31 and 32 | X = #, Y = #, Z = # |

Figure 7:
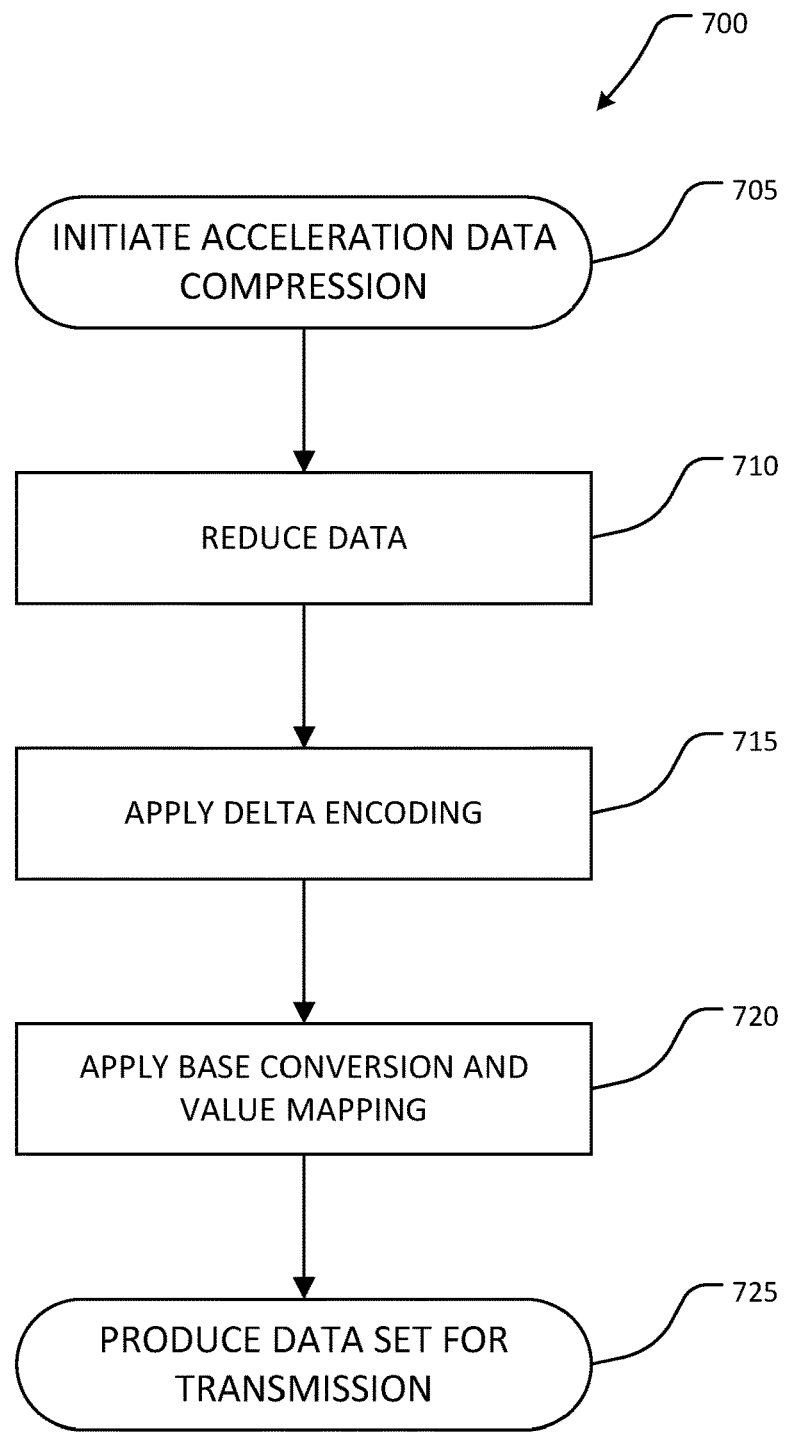
FIG. 7 is a flow chart illustrating an example method of compressing acceleration data records.

FIG. 7 is a flow chart illustrating an example method 700 of compressing acceleration data records. The method 700 may be performed by any mobile device capable of obtaining and transmitting acceleration data. For example, the method 700 may be performed by the mobile device 110 of FIGS. 1 and 2. The method 700 may be performed repeatedly any number of times as data is collected. For example, the mobile device 110 may perform the method 700 once each time a set of collected data is prepared for transmission. In some embodiments, the method 700 may be performed as subprocess 325 of the method 300 described above with reference to FIG. 3.

The method 700 begins at block 705, when acceleration data compression is initiated. In some embodiments, acceleration data compression may be initiated in the context of method 300 described above with reference to FIG. 3. For example, acceleration data compression may be initiated when the method 300 proceeds to subprocess 325. When acceleration data compression has been initiated, the method 700 continues to block 710.

At block 710, the processor 161 implements data reduction to remove unnecessary and/or redundant portions of the raw acceleration data records. In the Device Time field, the date may be removed from the second record and all subsequent records, with the date remaining in the first record to serve as an anchor for the following records. In the 3-axis Acceleration field, "AccOutput: [X=", "Y=", "Z=", and "]" may be removed from all records, as these portions of each 3-axis Acceleration entry are the same in every record and thus are not necessary. After the fields of the raw acceleration data records have been reduced, the method 700 continues to block 715.

At block 715, the processor 161 applies delta encoding to further reduce the size of the GPS data records. In some embodiments, only the Device Time field or both the Device Time and 3-axis Acceleration fields may be converted by delta encoding to reduce the size of each record. For Device Time, the field includes only a HH:MM:SS.SSS formatted time value following the data reduction at block 710. Thus, the HH:MM:SS.SSS time value of each record may be converted to seconds and multiplied by 1000 to produce an integer value. The second record and all subsequent records may then be delta encoded by replacing the Device Time entry with the difference between the full Device Time entry and the full Device Time entry of the preceding acceleration data record. In the event of an entry lacking a Device Time entry timestamp, or having an inaccurate timestamp, the record may be omitted and the following record may be kept in its reduced (non-delta encoded) format to serve as a new anchor for subsequent records. It will be understood that a similar delta encoding may be applied to the 3-axis Acceleration field, but delta encoding may be less useful for this field as the full range of possible values is from −31 to 32, such that the delta between consecutive acceleration values may include as many characters as the reduced value because device acceleration can often change frequently. When the acceleration data records have been delta encoded, the method 700 continues to block 720.

At block 720, the processor 161 applies numeric base conversion and value mapping to the Device Time and 3-axis Acceleration fields to further reduce the size of the GPS data records. In one example base conversion method for the Device Time field, the processor 161 converts the time values to Unicode. In a first step, the processor 161 may first add a constant value such as 1000 to each of the delta encoded values. For example, a time difference of 5000 milliseconds would result in a value of 6000. Next, the processor 161 treats the new value directly as a hexadecimal value. For example, a value of 6000 in decimal becomes 0x6000, having a decimal value of 24576. Next, the processor 161 uses the hexadecimal value to generate the equivalent Unicode character corresponding to the decimal value of the hexadecimal value. For example, a value of 0x6000 would result in the generation of "怀", corresponding to the decimal value 24576.

If the time difference value, alone or after addition of 1000 or other constant, is greater than 9999 (e.g., 10000 or greater), two Unicode characters may be used to represent the value. In this case, the four least significant (e.g., right-most) digits of the time difference value are directly translated into a new hexadecimal value as described above. For example, a value 266000 would have 6000 as the four least significant decimal digits. Thus, the least significant Unicode character for this value would be "怀" for 0x6000. Next, the significant decimal digits are shifted right by dividing by 10000, and any remainder from the division is dropped. For the example value of 266000, 266000/10000 becomes 26. The divided value is then treated as a hexadecimal value similarly (e.g., 0x26). The hexadecimal value is then converted to the Unicode value corresponding to the decimal equivalent of the hexadecimal value. In this case, the decimal equivalent of 0x26 is 38, and the corresponding Unicode value is "&". The record then comprises the most significant Unicode character followed by the least significant Unicode character (e.g., "&怀" corresponding to decimal values of 38 and 24576).

In an example base conversion method for the 3-axis Acceleration field, a constant value may be added to the field entry for each record to make all values positive. For example, adding a constant such as 65 to each of the values that range from −31 to 32 would result in a positive value for each record. Moreover, the constant-added values are unique in that their minimum value is 34, greater than the largest value before the addition of a constant. Following addition of a constant to yield all positive numbers, each 2-digit 3-axis Acceleration field value can be converted to its corresponding ASCII symbol. When the acceleration data records have undergone base conversion and value mapping, the method 700 continues to block 725.

At block 725, the method 700 terminates as the processor 161 produces the final data set for transmission. In some embodiments, the processor appends the 3-axis Acceleration value to the end of the Device Time value to yield a reduced data set. For example, the raw acceleration data set of Table 9 above, processed using the method 700, would yield the reduced set of acceleration data records as shown in Table 11 below.

TABLE 11

| Reduced acceleration data records |
|---|
| 1547764230310DV= |
| 彐EV= |
| ᴌᴌDU= |
| ᵁᵁDV> |
| ᵁDU= |
| ᵁDU= |
| ᴬᴱCV= |
| ˣˣDV= |
| ᵁDU= |
| ΔDV= |
| ᵅˣCV= |
| ᶜᶜDW= |
| ᴌᴌCV= |

TABLE 11-continued

Reduced acceleration data records

DW=
CU>
DV=
CV=
EU>
CV=
DU=
DV<
DU>
DU=
EV<
DU=
CW<
DU=
CU=
EV=
DV<
EV=
DU=
BU>
DV=
EW=
CU=
DV=
EU>
CW>
DV=
DV=
DV=

In addition, the processor 161 may perform one or more other compression methods, such as using GZIP or another known data compression protocol, in finalizing the set of acceleration data records for transmission. It will be understood that the original raw acceleration data records may be reconstructed, such as at the remote computing device following transmission, by reversing the steps of the data reduction method 700 as described herein.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C #), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A system for tracking one or more mobile devices in a distribution network, the system comprising:
    a data center in communication with a network; and
    a plurality of mobile delivery devices in communication with the data center via the network, each mobile delivery device comprising:
        one or more sensors configured to periodically generate tracking data records;
        a memory; and
        a processor in communication with the one or more sensors and the memory, the processor configured to:
            receive the tracking data records from the one or more sensors;
            cause the received tracking data records to be stored in the memory;
            select, from the stored tracking data records, a set of tracking data records for compression, each record of the set of track data comprising a plurality of number valued fields separated by at least one field separator;
            apply delta encoding to the plurality of number valued fields of at least one record of the set of tracking data records;
            apply a conversion to the plurality of number valued fields of the at least one record of the set of tracking data records;
            determine whether a number of converted characters in the at least one record of the set of tracking data records exceeds a length threshold;
            remove one or more field separators from the at least one record based on the number of converted characters not exceeding the length threshold to generate a compressed data set; and
            transmit the compressed data set to the data center via the network.

2. The system of claim 1, wherein the data center comprises:
    a data store; and
    a server in communication with the network and the data store, the server configured to receive the compressed data set via the network.

3. The system of claim 2, wherein the server is further configured to:
    decompress the compressed data set to generate a set of reconstructed tracking data records; and
    cause the set of reconstructed tracking data records to be stored in the data store.

4. The system of claim 3, wherein the server is further configured to:
    cause the compressed data set to be stored in the data store; and
    retrieve the compressed data set from the data store prior to decompressing the compressed data set.

5. The system of claim 1, wherein the one or more sensors comprise a GPS receiver, and wherein the tracking data records comprise GPRMC location data records.

6. The system of claim 1, wherein the one or more sensors comprise an accelerometer, and wherein the tracking data records comprise 3-axis acceleration data records.

7. The system of claim 1, wherein the set of tracking data records is selected from the tracking data records based on a periodic schedule.

8. The system of claim 7, wherein the processor is configured to transmit subsequent compressed data sets to the data center periodically at a predetermined time interval, and wherein the processor is configured to select subsequent sets of tracking data records for compression at the predetermined time interval, each subsequent set comprising the tracking data records received since a preceding set of tracking data records was selected.

9. A mobile device configured for efficient device tracking, the mobile device comprising:
- a GPS receiver configured to periodically generate location data records at a first periodicity;
- a memory; and
- a processor in communication with the GPS receiver, the memory, and a wireless data network, the processor configured to:
  - receive the location data records from the GPS receiver;
  - store the received location data records in the memory;
  - select, from the stored location data records, a subset of location data records for compression using a second periodicity that is different from the first periodicity;
  - compress the subset of location data records by at least applying delta encoding and numeric base conversion to one or more number valued fields of the subset of location data records, to generate a compressed location data set; and
  - transmit, at a third periodicity, the compressed location data set to a remote computing device via the wireless data network.

10. The mobile device of claim 9, wherein the location data records generated by the GPS receiver are GPRMC records.

11. The mobile device of claim 10, wherein the compressed location data set comprises a set of compressed records having an average size of less than 10 bytes per record.

12. The mobile device of claim 9, wherein the delta encoding comprises replacing at least a time value, a latitude value, or a longitude value of each record in the subset with a delta value calculated based on a corresponding value in a preceding record.

13. The mobile device of claim 9, wherein the numeric base conversion comprises replacing at least one field value with one or more characters generated by converting the field value from a decimal value to a base-62 value.

14. The mobile device of claim 9, wherein compressing the set of location data records further comprises eliminating at least one field and at least one field separator from each record in the subset.

15. The mobile device of claim 9, wherein compressing the set of location data records further comprises deleting at least a date portion of a device time field each record in the subset.

16. A mobile device configured for efficient device tracking, the mobile device comprising:
- an accelerometer configured to generate acceleration data records at a first periodicity and to transmit the acceleration data records;
- a memory; and
- a processor in communication with the accelerometer, the memory, and a wireless data network, the processor configured to:
  - receive the acceleration data records from the accelerometer;
  - cause the received acceleration data records to be stored in the memory;
  - select, from the stored acceleration data records, a subset of acceleration data records for compression using a second periodicity that is different from the first periodicity;
  - apply delta encoding to the subset of the acceleration data records;
  - apply a conversion to the subset of the acceleration data records to generate a compressed acceleration data set; and
  - transmit the compressed acceleration data set to a remote computing device via the wireless data network.

17. The mobile device of claim 16, wherein the acceleration data records generated by the accelerometer comprise a device time field and a 3-axis acceleration field.

18. The mobile device of claim 17, wherein applying the delta encoding comprises replacing a value in the device time field of each record in the subset with a delta value calculated based on an entry in the device time field of a preceding record.

19. The mobile device of claim 17, wherein applying the conversion comprises replacing each value in the 3-axis acceleration field of each record in the subset with an ASCII symbol corresponding to a 2-digit number calculated based on the value.

* * * * *